(12) United States Patent
Hovorka et al.

(10) Patent No.: US 10,634,607 B1
(45) Date of Patent: Apr. 28, 2020

(54) SNAPSHOT ELLIPSOMETER

(71) Applicants: Griffin A. P. Hovorka, Lincoln, NE (US); Jeremy A. Van Derslice, Dwight, NE (US)

(72) Inventors: Griffin A. P. Hovorka, Lincoln, NE (US); Jeremy A. Van Derslice, Dwight, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 0 days.

(21) Appl. No.: 16/350,204

(22) Filed: Oct. 12, 2018

(51) Int. Cl.
*G01N 21/21* (2006.01)

(52) U.S. Cl.
CPC ..... *G01N 21/211* (2013.01); *G01N 2021/213* (2013.01); *G01N 2201/0635* (2013.01); *G01N 2201/0683* (2013.01)

(58) Field of Classification Search
CPC .................. G01N 21/21; G01N 21/211; G01N 2021/213; G01N 2201/0635; G01N 2201/0683
USPC ......................................................... 356/369
See application file for complete search history.

(56) References Cited

U.S. PATENT DOCUMENTS

| | | | | |
|---|---|---|---|---|
| 5,166,752 A * | 11/1992 | Spanier | ................ | G01N 21/211 250/201.2 |
| 5,335,066 A * | 8/1994 | Yamada | ................ | G01N 21/211 356/364 |
| 5,754,296 A * | 5/1998 | Law | ................... | G01B 11/065 356/369 |
| 6,052,188 A * | 4/2000 | Fluckiger | ................. | G01J 4/04 356/369 |
| 6,275,291 B1 * | 8/2001 | Abraham | ................. | G01J 4/04 356/364 |
| 6,456,376 B1 * | 9/2002 | Liphardt | ................. | G01J 3/447 356/369 |
| 6,850,326 B2 * | 2/2005 | Thoma | ..................... | G01J 9/00 356/364 |
| 7,038,776 B1 * | 5/2006 | Ansley | ..................... | G01J 4/04 356/364 |
| 7,064,828 B1 * | 6/2006 | Rovira | ................... | G01J 3/447 356/369 |
| 7,336,360 B2 * | 2/2008 | Oka | ..................... | G02B 27/281 356/365 |
| 7,468,794 B1 * | 12/2008 | Liphardt | .............. | G01N 21/211 356/369 |
| 7,489,399 B1 * | 2/2009 | Lee | .................... | G01B 11/0641 356/369 |
| 7,505,133 B1 * | 3/2009 | Zawaideh | .......... | G01B 11/0641 356/369 |
| 7,671,989 B2 * | 3/2010 | Liphardt | .................. | G01J 1/04 356/369 |
| 8,812,277 B2 * | 8/2014 | Li | .......................... | G01B 11/00 703/2 |

(Continued)

*Primary Examiner* — Roy M Punnoose
(74) *Attorney, Agent, or Firm* — James D. Welch

(57) ABSTRACT

A snapshot ellipsometer or polarimeter which does not require temporally modulated element(s) to measure a sample, but instead uses one or more spatially varying compensators, (eg. microretarder arrays and compound prisms), to vary the polarization state within a measurement beam of electromagnetic radiation. Analysis of the intensity profile of the beam after interaction with the spatially varying compensator(s) and the sample allows sample parameters to be characterized without any moving optics.

22 Claims, 5 Drawing Sheets

Front View

(56) References Cited

U.S. PATENT DOCUMENTS

| | | | | |
|---|---|---|---|---|
| 9,097,585 B2* | 8/2015 | Sparks | ............... | G01J 3/447 |
| 2006/0268272 A1* | 11/2006 | Liphardt | ............... | G01J 3/02 |
| | | | | 356/369 |
| 2010/0245819 A1* | 9/2010 | Li | ............... | G01B 11/0641 |
| | | | | 356/327 |
| 2011/0246141 A1* | 10/2011 | Li | ............... | G01B 21/24 |
| | | | | 703/2 |
| 2013/0063722 A1* | 3/2013 | Sparks | ............... | G01J 3/44 |
| | | | | 356/327 |
| 2016/0061723 A1* | 3/2016 | Alonso | ............... | G01B 11/22 |
| | | | | 356/364 |

* cited by examiner

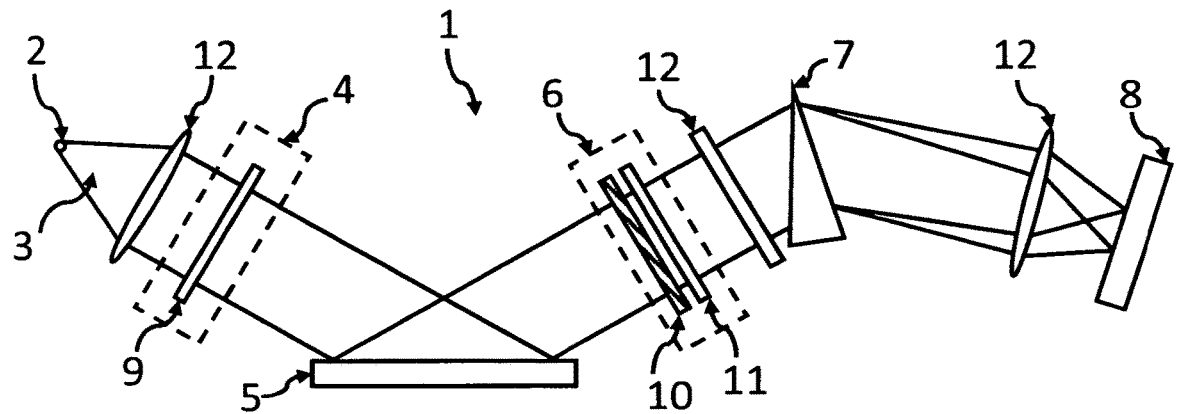
Fig. 1A Front View
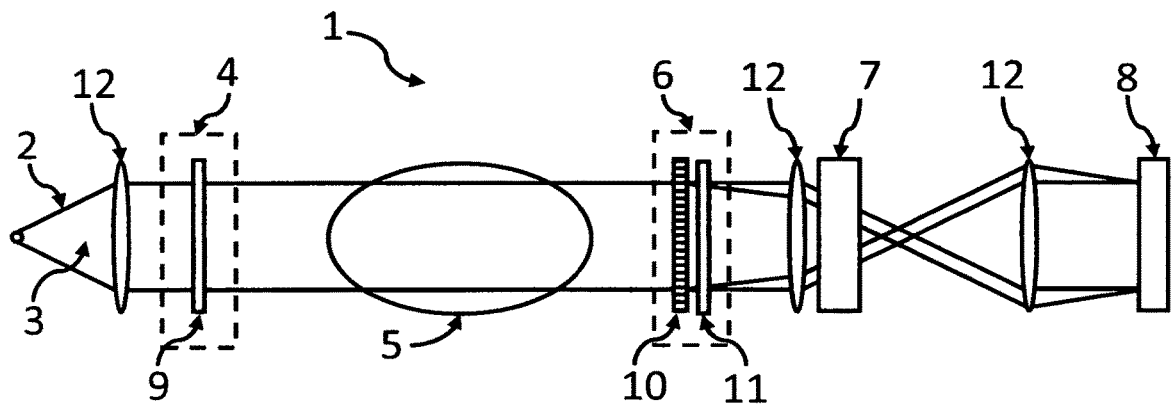
Fig. 1B Top View
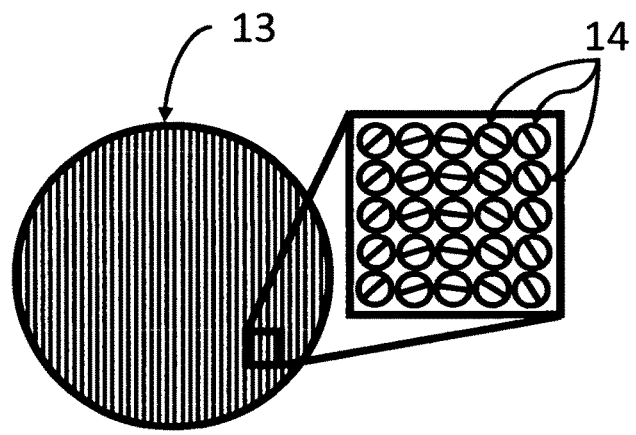
Fig. 2

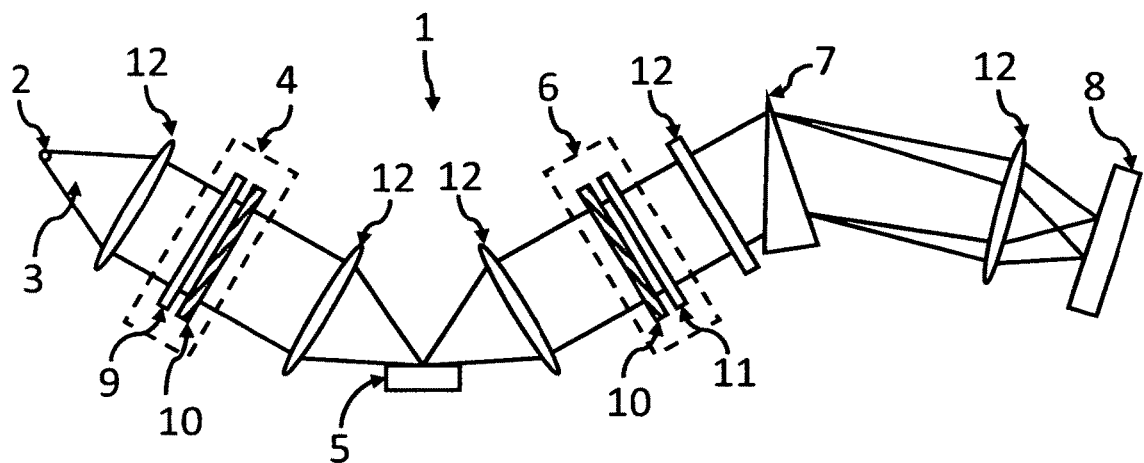
Fig. 4A Front View
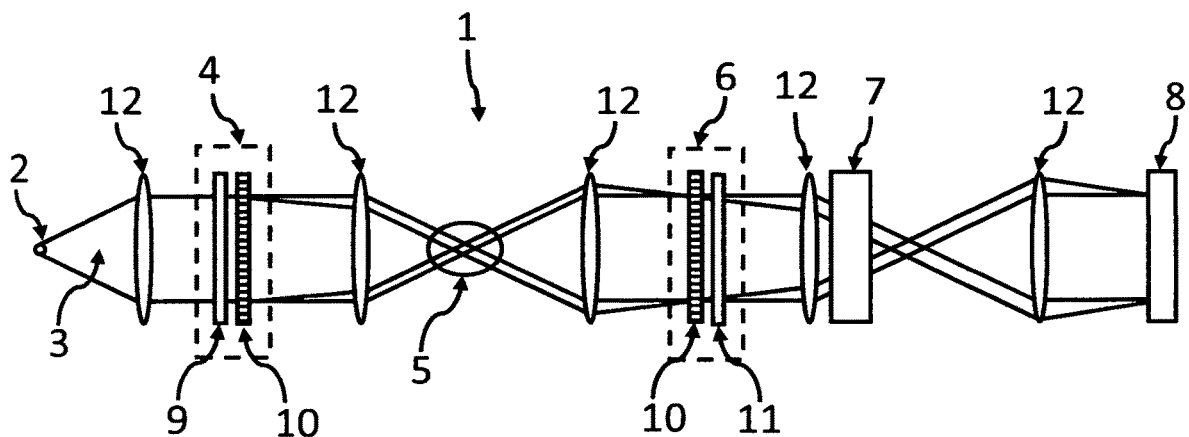
Fig. 4B Top View

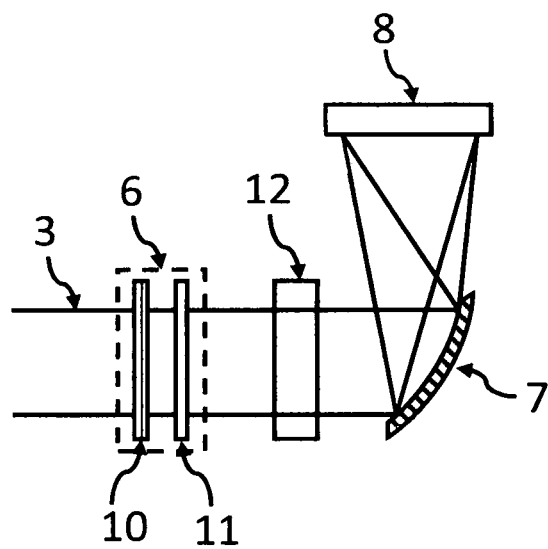
Fig. 7A Front View
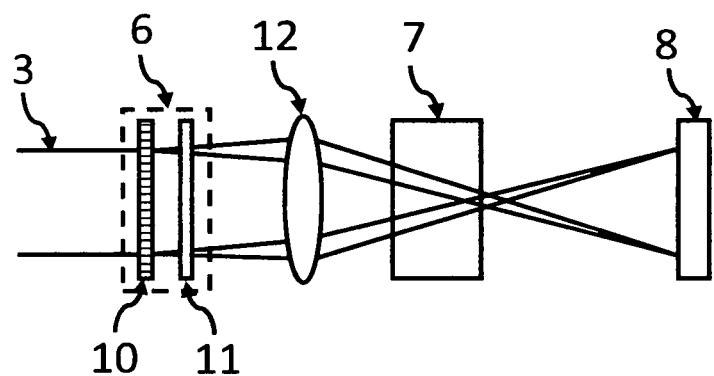
Fig. 7B Alt. View

SNAPSHOT ELLIPSOMETER

This Application Claims Benefit from Provisionals 62/606,922 Filed Oct. 13, 2017, and 62/707,785 Filed Nov. 16, 2017.

TECHNICAL FIELD

The present invention relates to ellipsometers and the like systems to measure the optical properties and physical parameters of samples. More particularly, the present invention relates to spectroscopic ellipsometers that characterize samples by spatially varying the polarization state of a measurement beam.

BACKGROUND

In traditional ellipsometry, the polarization state of a beam of electromagnetic radiation is modulated and/or analyzed by varying at least one polarization state parameter as a function of time. Rotating-optic ellipsometers linearly vary the azimuthal position of at least one optical element by rotating the element. Each rotating element induces a temporal modulation in the signal intensity at a frequency related to the rotation rate of the optic. Early developments employed rotating analyzers or polarizers which were unable to measure the sign of the phase change ($\Delta$) caused by a sample. Later improvements took advantage of rotating compensators to provide sensitivity to this parameter. Another type of ellipsometer uses photoelastic modulators to vary the retardance of an optic as a function of time, typically in a sinusoidal manner by imparting a voltage on a piezoelectric transducer that induces stress in a photoelastic crystal. This stress results in a varying birefringence within the crystal and results in retardance in the measurement beam. In each of the above types of ellipsometer, the temporal modulation in the signal intensity is analyzed to determine optical properties of the sample.

In general, elements such as rotating compensators and photoelastic modulators have several drawbacks. Because the polarization modulation is a function of time, multiple measurement frames must be captured to completely describe the polarization state of the beam. For this reason, the measurement speed for any temporally modulated ellipsometer is fundamentally limited by its hardware. For moving or rapidly changing samples, such as in coating processes, it would be advantageous to complete a measurement with stationary optics. A stationary-element ellipsometer could also potentially be more stable, simple, and compact than a temporally modulated system.

To overcome the limitations of prior art ellipsometers, several designs for systems that eliminate the use of temporal modulation of the detected beam have been proposed. Channeled ellipsometers and polarimeters encode information about the polarization state of the beam onto the same dimension of the detector utilized for spectral or spatial information. In spectrally channeled ellipsometry, this is accomplished using a multi-order retarder. The retarder has polarization effects that are strongly wavelength-dependent, thereby creating a strong modulation pattern at a higher frequency within the spectral intensity profile. Similarly, spatially channeled systems modulate the intensity along one or both dimensions of an image plane by imaging a spatially varying optic such as a wedged retarder. Systems that utilize this approach have potential to capture a great deal of information about the spectral, polarization, and spatial components of a beam simultaneously, as described by Oka et al. in U.S. Pat. No. 7,336,360B2. The major drawback of channeled systems is that the information related to each variable must be separated. In much prior art, this is accomplished by Fourier transforming the resulting intensity information to pick out the characteristic frequencies of each individual source of modulation. Several drawbacks of this technology include more complex signal processing, increased noise, and decreased resolution.

Snapshot ellipsometers and polarimeters can provide the benefits of stationary optics without the drawbacks of channeled systems. In snapshot systems, spatial modulation of the signal is induced by imaging a spatially varying optical element onto a dedicated dimension of a multi-element detector. If a two-dimensional detector is used, the other dimension can be used to capture information related to spectral, angular, or spatial characteristics of a sample or beam. In the case of snapshot spectroscopic ellipsometry, an additional element separates the electromagnetic radiation spectrally along the orthogonal detector dimension, allowing full characterization of the polarization state and spectral profile of a beam in a single frame capture of the detector. Because the spectral separation and polarization modulation directions are independent, signal processing is straightforward and analogous to traditional ellipsometry techniques.

Mueller-Stokes calculus can be used to express the change in polarization caused by each element within the optical train of an ellipsometer. The polarization state of electromagnetic radiation is represented by a Stokes Vector, and each element is described by a Mueller Matrix that describes the polarization effects of the optic.

Mueller-Stokes descriptions for some common polarization elements are provided below.

Unpolarized light is characterized by intensity, I, and is described by the following Stokes vector:

$$\text{Unpolarized Light}(L) = I \begin{pmatrix} 1 \\ 0 \\ 0 \\ 0 \end{pmatrix}$$

The matrix below converts the Stokes vector representing a polarized beam to a scalar representation of the intensity on the detector.

$$\text{Detector}(D) = \text{Attn} \cdot (1\ 0\ 0\ 0)$$

A polarizer is an element with a characteristic pass axis that transmits only electromagnetic radiation with a polarization oriented along said axis.

$$\text{Polarizer}(P) = \frac{1}{2}\begin{pmatrix} 1 & 1 & 0 & 0 \\ 1 & 1 & 0 & 0 \\ 0 & 0 & 0 & 0 \\ 0 & 0 & 0 & 0 \end{pmatrix}$$

An analyzer is a polarizer that is present after the sample in an ellipsometry system. The Mueller matrix describing an Analyzer is identical to that of a polarizer.

$$\text{Analyzer}(A) = \frac{1}{2}\begin{pmatrix} 1 & 1 & 0 & 0 \\ 1 & 1 & 0 & 0 \\ 0 & 0 & 0 & 0 \\ 0 & 0 & 0 & 0 \end{pmatrix}$$

Compensators act by retarding one component of the transverse electromagnetic wave with respect to its orthogonal component. This effect is described by the following expression, where the retardance (d) is a function of the extraordinary and ordinary refractive indices ($n_e$, $n_o$) of the birefringent crystal and thickness (T) of the material through which the electromagnetic radiation of wavelength ($\lambda$) propagates.

$$d = \frac{2\pi}{\lambda} \cdot |n_e - n_o| \cdot T$$

The Mueller matrix describing a general compensator is as follows:

$$\text{Compensator}(C) = \begin{pmatrix} 1 & 0 & 0 & 0 \\ 0 & 1 & 0 & 0 \\ 0 & 0 & \cos(d) & -\sin(d) \\ 0 & 0 & \sin(d) & \cos(d) \end{pmatrix}$$

For any element that has characteristic polarization axes, such as a polarizer or compensator, rotation matrices are used to describe the azimuthal position ($\theta$) of the element with respect to the plane of incidence.

$$\text{Rotation}(R) = \begin{pmatrix} 1 & 0 & 0 & 0 \\ 0 & \cos(2\theta) & \sin(2\theta) & 0 \\ 0 & -\sin(2\theta) & \sin(2\theta) & 0 \\ 0 & 0 & 0 & 1 \end{pmatrix}$$

The most general mathematical description of a sample is a Mueller matrix consisting of 16 elements which can fully describe any change in polarization state of a beam caused by a sample.

$$\text{Mueller Matrix Sample}(S_{MM}) = \begin{pmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{pmatrix}$$

In traditional ellipsometry, the polarization change caused by a sample was described by two parameters, $\psi$ and $\Delta$, but this notation is insufficient for describing partially polarized beams or depolarizing samples.

$$\text{Isotropic Sample}(S_{Iso}) = \begin{pmatrix} 1 & -\cos(2\psi) & 0 & 0 \\ -\cos(2\psi) & 1 & 0 & 0 \\ 0 & 0 & \sin(2\psi)\cos(\Delta) & \sin(2\psi)\sin(\Delta) \\ 0 & 0 & -\sin(2\psi)\sin(\Delta) & \sin(2\psi)\cos(\Delta) \end{pmatrix}$$

An alternative notation can be used to fully describe isotropic samples and partially polarized beams. The isotropic quantities are related in the following manner and can be substituted into the previous matrix as shown:

$$N = \cos(2\psi)$$

$$C = \sin(2\psi)\cos(\Delta)$$

$$S = \sin(2\psi)\sin(\Delta)$$

$$\text{Isotropic Sample}(S_{Iso}) = \begin{pmatrix} 1 & -N & 0 & 0 \\ -N & 1 & 0 & 0 \\ 0 & 0 & C & S \\ 0 & 0 & -S & C \end{pmatrix}.$$

The N, C, & S notation is advantageous because it provides a simple relationship to depolarization. Depolarization is defined as the transformation of fully polarized electromagnetic radiation to partially polarized electromagnetic radiation and can be expressed in the following manner for isotropic samples:

% Depolarization=$100\% \cdot (1 - N^2 - C^2 - S^2)$

Depolarization can be caused by a variety of factors, including; surface electromagnetic radiation scattering, sample non-uniformity, spectrometer bandwidth resolution, angular spread from a non-collimated input beam, and incoherent summation of electromagnetic radiation reflecting from the backside of a substrate. Depolarization measurements help to identify non-idealities in the sample or system.

One of the most common elements used in prior art snapshot ellipsometers is a wedge of some birefringent material. Because the retardance of a compensator is proportional to its thickness, a birefringent optic with spatially variable thickness has different values of retardance at different positions. Because different portions of a measurement beam interact with different portions of the optic, the polarization state of the measurement beam becomes spatially modulated.

The simplest example of such an optic is a linear wedge made of a birefringent crystal. The thickness T of such a wedge can be described as a function of spatial position x along the direction of variation, where the rate of change is defined by the slope of the wedge, w.

$$T(x) = w \cdot x$$

Substituting the wedge thickness into the general retardance equation, the retardance across the wedge can be described as a function of spatial position.

$$d(x) = \frac{2\pi}{\lambda} \cdot |n_e - n_o| \cdot w \cdot x$$

A new term D is defined to express the rate of retardance change.

$$D = \frac{2\pi}{\lambda} \cdot |n_e - n_o| \cdot w$$

$$d(x) = D \cdot x$$

The Mueller matrix description of a wedged birefringent crystal is like that of a standard compensator, where the spatial retardance is defined by d(x).

$$Wedge(W[x]) = \begin{pmatrix} 1 & 0 & 0 & 0 \\ 0 & 1 & 0 & 0 \\ 0 & 0 & \cos(Dx) & -\sin(Dx) \\ 0 & 0 & \sin(Dx) & \cos(Dx) \end{pmatrix}$$

Any optic with birefringence and variable thickness will spatially modulate the polarization state of a beam incident thereon, and the term 'wedge' is used herein to describe any optic with such a thickness variation, not to specifically define that the thickness varies linearly or continuously as in the example above. An optic exhibiting a discrete stepwise thickness profile or one that varies nonlinearly could be easily substituted by one skilled in the art.

A common modification of a linearly wedged retarder as described above is a Babinet compensator. A Babinet compensator is a set of two equally-wedged crystals of uniaxially anisotropic material. The wedges are oriented with the two wedged faces in contact or with a small gap between them and the two opposite faces parallel to each other and normal to the incident beam, as illustrated in FIG. 3B. The optic axes of the two wedges are orthogonal to each other and the beam.

The Mueller matrix describing the Babinet compensator can be defined by matrix multiplication of the two component wedges with optic axes of $W_1$, $W_2$:

$$Babinet[x] = R(-W_2) \cdot W_2[x] \cdot R(W_2) \cdot R(-W_1) \cdot W_1[x] \cdot R(W_1)$$

Because the slopes of the two wedges are equal and opposite, the retardance rate is defined as B for the first wedge and −B for the second.

$$Babinet[x] = \begin{pmatrix} 1 & 0 & 0 & 0 \\ 0 & 1 & 0 & 0 \\ 0 & 0 & \cos[2Bx] & -\sin[2Bx] \\ 0 & 0 & \sin[2Bx] & \cos[2Bx] \end{pmatrix}$$

This matrix is clearly equivalent to that of a single wedge with double the rate of retardance variation than the component wedges. Recognizing that a Babinet compensator therefore produces the same polarization modulation as a single wedge with a different slope, it should be obvious to one skilled in the art that birefringent wedges can be replaced with combinations of wedges in order to produce spatial modulation of polarization state within a beam. The benefit of a Babinet compensator is that the retardance near the center of the optic is zero-order and the beam experiences less deviation and separation when transmitted therethrough. As such, the term 'wedge' is further understood to refer both to individual wedges and combinations of wedges or optics, such as Babinet compensators, which are used to affect a spatially varying retardance to a beam along one azimuth.

U.S. Pat. No. 6,052,188A (1998) by Fluckiger et al. describes an ellipsometer that uses a single wedge in order to impart spatially varied retardance to a beam. The ellipsometer system described by Fluckiger was novel in its implementation but limited in its inability to detect all sample parameters describing isotropic samples and severely limited in measuring anisotropic samples. Fluckiger specified a Babinet compensator to be preferred over a single wedge for the reasons given above.

Using the matrices defined above, the spatially varying signal intensity of a single wedge system can be expressed by the following matrix multiplication:

$$Intensity(x) = D \cdot R(-A) \cdot A \cdot R(A) \cdot R(-W) \cdot W[x] \cdot R(W) \cdot S \cdot R(-P) \cdot P \cdot R(P) \cdot L$$

The polarizer and analyzer should be oriented at a non-eigenpolarization state of the wedge for each measurement. Assuming an isotropic sample and that polarizer and analyzer azimuth are set to 45*, the spatial variation of beam intensity can be expressed as follows:

$$Intensity(x) = 1 + C \cdot \cos[2 \cdot D \cdot x] \cdot S \cdot \sin[2 \cdot D \cdot x]$$

A Fourier transformation of the signal along the axis of variation on the detector decomposes the expression into components occurring at different spatial frequencies.

$$\alpha_k = \text{Re}\left\{ \frac{1}{P} \int_{-\frac{P}{2}}^{\frac{P}{2}} (1 + C \cdot \cos[2 \cdot D \cdot x] - S \cdot \sin[2 \cdot D \cdot x]) \cdot e^{-2\pi i \left(\frac{k}{P}\right)x} dx \right\}$$

$$\beta_k = \text{Im}\left\{ \frac{1}{P} \int_{-\frac{P}{2}}^{\frac{P}{2}} (1 + C \cdot \cos[2 \cdot D \cdot x] - S \cdot \sin[2 \cdot D \cdot x]) \cdot e^{-2\pi i \left(\frac{k}{P}\right)x} dx \right\}$$

The real ($\alpha_k$) and imaginary ($\beta_k$) Fourier coefficients are non-zero at certain frequencies, k, related to the spatial variation of the compensator. Fourier transformation of the theoretical intensity expression identifies a single harmonic frequency (k=2D) and a DC (k=0) term. The theoretical Fourier coefficients are related to sample parameters as follows:

$$\alpha_0 = 1$$

$$\alpha_{2D} = C$$

$$\beta_{2D} = -S$$

Using the theoretical expressions for Fourier coefficients to solve for sample parameters, it's evident the snapshot ellipsometer using a single wedge can measure only two sample parameters in any single measurement, as shown in the following Mueller matrix description of the sample (X indicates insensitivity to a parameter).

$$Sample(S) = \begin{pmatrix} 1 & X & 0 & X \\ X & X & X & X \\ 0 & X & \alpha_{2D} & X \\ 0 & X & -\beta_{2D} & X \end{pmatrix}$$

A single wedge system therefore cannot fully characterize an isotropic sample because only two of the three sample parameters can be measured simultaneously. As arranged, systematic errors and noise in the measured data are amplified when measuring samples with Psi near 45°. For a single wedge system, all arrangements of polarizing optics result in amplified error in Psi and Delta for certain sample types.

PRIOR ART

In addition to Oka et al., U.S. Pat. Nos. 7,336,360B2, and 6,052,188A (1998) to Fluckiger et al. already mentioned, it is disclosed that they, and additional Patents were identified. For convenience, all known prior art Patents are presented, and briefly described directly.

U.S. Pat. No. 6,052,188A (1998) by Fluckiger et al. describes an ellipsometer that uses a single wedge in order to impart spatially varied retardance to a beam. The ellipsometer system described by Fluckiger was novel in its implementation but limited in its inability to detect all sample parameters describing isotropic samples and severely limited in measuring anisotropic samples. Fluckiger specified a Babinet compensator to be preferred over a single wedge.

Several inventions in the related field of polarimetry have sought to solve the same challenges faced in ellipsometry. Polarimeters are instruments used to measure the polarization state, and sometimes spectral characteristics, of a beam of electromagnetic radiation. Similarly, in ellipsometry knowledge of the state of the beam before and after interacting with the sample allows the determination of optical properties and physical structure of the sample. To determine more information about the sample, it is advantageous to be able to fully characterize the polarization state of the electromagnetic radiation beam after interacting with the sample. Polarimeters, however, are not ellipsometers in that they do not have an electromagnetic radiation source, a polarization state generator, or the ability to directly extract sample parameters from the measured polarization information. Polarimeters traditionally use temporally varying elements to analyze a beam, but some recent inventors have sought to create polarimeters with stationary elements.

U.S. Pat. No. 6,850,326B2 (2002) by Thoma et al. patents a single-wedge polarimeter identical to that used by Fluckiger in his ellipsometer, but without the ability to measure spectroscopically. He also claims using two wedges with different slope directions to determine more information about the polarization state of a beam. By orienting the wedges in different directions, variable retardance is applied independently to the two axes, allowing simplified data analysis but requiring two dimensions on the detector to analyze.

U.S. Pat. No. 7,336,360B2 (2006) by Oka et al. patents an imaging version of the advancement described by Thoma, wherein two wedges are similarly oriented with different slope directions to separate each retardance modulation onto a different axis of the detector. The rate of retardance variation is high enough that many orders of modulation are captured and data can be independently determined at many points across both dimensions of the beam.

U.S. Pat. No. 909,758,582 (2012) by Sparks also patents the polarimeter described by Fluckiger, but in the form of a point-and-shoot spectropolarimeter with an entrance slit. It also describes the possibility of using two wedge sets to completely characterize the measurement beam, with the requirement that "the gradient of retardance of the second optic is at a different angle and strength" than the first. The claims make it clear that the second wedge is "either parallel or anti-parallel to said first birefringent wedge and having twice the birefringence of said first" meaning the difference in strength of the gradients is due to the different birefringence of the wedges. As mentioned previously, Sparks' system is a spectropolarimeter requiring an entrance slit directly next to the wedge pair(s).

U.S. Pat. No. 7,038,776B1 (2005) by Ansley et al. describes a polarimeter that has an input slit that is focused onto a detector with three polarizing filters overlaid. Similarly to early ellipsometers, the use of only polarization filters means that the device can't characterize direction of rotation for circular polarization.

U.S. Pat. No. 6,275,291B1 (1999) by Abraham et al. patents a polarimeter utilizing a specific type of spatially varying retarder array made of deposited dielectric grid structures with intervals less than the wavelength of electromagnetic radiation used. This optic generates retardance due to the interaction of the beam with the grid structure of the element instead of due to the birefringence of a material. This modulation is used in a polarimeter to determine the polarization, state of a beam. Abraham also describes two specific applications of his polarimeter. First, in a reflected electromagnetic radiation microscope to form an imaging ellipsometer. In this application, the optic and a polarizing film are overlaid onto the detector. Second, in a more traditional ellipsometer with a laser source.

U.S. Pat. No. 9,793,178B2 (2015) by Alonso et al. describes a focused beam scatterometry apparatus that provides a focused beam onto a sample to be investigated from a source positioned vertically above the sample. The system comprises a beam splitter and focusing lens prior to a sample investigated such that the focused beam presents with spatially varying polarization states but there is no element on the detector side to impose such a spatially varying polarization state. The beam is incident at a locus normal to the sample and is reflected back along the incident beam path.

U.S. Pat. No. 7,489,399B1 (2004) by Lee describes an advancement to the ellipsometers described by Fluckiger and Abraham. Namely, Lee uses a polarizing beam splitter and a retroreflecting path design with a concave mirror to make the unit more compact.

Even in view of the known prior art, there remains need for advancement in the areas of ellipsometry and polarimetry.

DISCLOSURE OF THE INVENTION

The present invention is, in part, an ellipsometer comprising:
  a) a source of a beam of electromagnetic radiation (2);
  b) a polarization state generator (4);
  c) a provision for causing a beam of electromagnetic radiation (3) to interact with a sample (5) at a known angle of incidence;
  d) a polarization state analyzer (6), and
  e) a multi-element detector (8) of electromagnetic radiation.

In use, a beam of electromagnetic radiation (3) is generated by said source of a beam of electromagnetic radiation (2), and is caused to interact with said polarization state generator (4), a sample (5), said polarization state analyzer (6), and said multi-element detector (8). Said polarization state generator (4) and/or said polarization state analyzer (6) further contain at least one of the following spatially varying compensators (10):
  a combination of two or more birefringent optics (16) with crystal axes oblique to each other and spatial thickness variation; and
  an array (13) of retarding elements (14) not structured on the order of the measured wavelength(s).

Said spatially varying compensator (10) functions to impart a plurality of spatially separated polarization states such that a spatial distribution of intensities over a cross-sectional area of said beam results, which, after interacting with the polarization state analyzer (6) are detected at a corresponding multiplicity of positions by a corresponding plurality of spatially distributed elements in said detector (8), which can be analyzed to determine sample properties.

Said ellipsometer can further comprises at least one imaging element present between the spatially varying compensators (10) and said multi-element detector (8) to improve resolution regarding correspondence between specific points on said spatially varying compensators (10) and said detector (8).

Said ellipsometer can provide that the beam provided by said source of a beam of electromagnetic radiation (2) comprises multiple wavelengths, and in which said detector (8) is two-dimensional, and wherein said ellipsometer further comprises at least one wavelength separating element (7) prior to said detector (8), such that in use the polarization effects of the sample can be determined for multiple wavelengths at each location of a sample investigated. The at least one wavelength separating element (7) can be selected from the group consisting of:

a planar or curved diffraction grating;
a dispersing prism; and
an attenuating or reflecting filter element that transmits, blocks, or reflects different wavelengths at different positions thereof.

Further, said ellipsometer can provide that at least one additional imaging optic (12) resolves the spectral variation caused by said wavelength separating element (7) onto one dimension of the detector (8).

Said ellipsometer can provide that said source of a beam of electromagnetic radiation (2) is selected from the group consisting of:

a broadband or monochromatic laser;
a broadband or narrowband LED;
a monochromator;
a broadband source;
a FTIR source;
a globar source;
an incandescent source; and
an arc lamp.

Said ellipsometer can provide that multiple sources of a beam of electromagnetic radiation (2) are used in combination to provide a wider or more favorable spectrum.

Said ellipsometer can further contain a beam splitting element and the intensity profiles of both resulting beams are detected in order to improve data quality or provide an image of the beam profile or sample surface.

Said ellipsometer can provide that a spatially varying compensator (10) is present in both the polarization state generator (4) and polarization state analyzer (6), and where the spatial modulation of the two elements are optically overlaid with a known relationship using imaging optics and/or low divergence illumination.

Said ellipsometer can provide that the spatially varying compensators (10) impart different effective modulation frequencies onto the detector through magnifying optics, variations in spatially varying compensator characteristics, and/or converging or expanding illumination.

Said ellipsometer can provide that the effective spatial modulation frequencies of the polarization state generator (4) and polarization state analyzer (6) are at a ratio of 1:3, 3:1, 1:5, 5:1, 3:5, or 5:3.

Said ellipsometer can provide that an angle of incidence of said beam of electromagnetic radiation to a surface of said sample (5) is adjustable via a mechanism that moves some or all of the optics of the ellipsometer with respect to the sample.

Said ellipsometer can provide that the source of a beam of electromagnetic radiation (2) is the output from a monochromator, an optical fiber, or a pinhole so that the beam has favorable spectral or spatial characteristics.

Said ellipsometer can provide that the beam of electromagnetic radiation provided by said source of a beam of electromagnetic radiation (2) does not approach the sample surface along a locus normal to, or substantially normal thereto.

Said ellipsometer can provide that at least one selection from the group consisting of:

the source does not comprise one or more lasers, and
there is no series combination of a slit and wedge shaped compensator element between the source and the sample.

A method of characterizing a sample then comprises the steps of:
a) providing an ellipsometer as just described;
b) accessing data provided by said detector (8) in response to the beam of electromagnetic radiation input thereto, and
c) analyzing said data to characterize said sample (5).

The present invention is alternatively recited as an ellipsometer comprising:
a) a source of a beam of electromagnetic radiation (2);
b) a polarization state generator (4);
c) a provision for causing a sample to interact with said beam at a known angle of incidence;
d) a polarization state analyzer (6); and
e) a multi-element detector (8) of electromagnetic radiation.

Said ellipsometer is characterized in that both said polarization state generator (4) and said polarization state analyzer (6) comprise at least one element having a plurality of locations (13) (14), or a plurality of elements each having at least one location (16), or a combination thereof, each of said element locations serving to effect beam polarization characteristics that depend on how a portion of said beam cross-sectional area interacts with at least one of said locations therein.

In use the beam of electromagnetic radiation generated by said source of a beam of electromagnetic radiation (2) is caused to interact with said polarization state generator (4), said sample (5), and said polarization state analyzer (6), such that a spatial intensity distribution results over the cross-section of said beam and a corresponding plurality of locations in said beam cross-section are substantially simultaneously detected by said multi-element detector (8). Said intensity profile can then be analyzed using knowledge of the properties of the polarization state generator (4) and polarization state analyzer (6) to characterize properties of said sample (5).

A method of characterizing a sample then comprises the steps of:
a) providing an ellipsometer as just described;
b) accessing data provided by said detector (8) in response to the beam of electromagnetic radiation input thereto, and
c) analyzing said data to characterize said sample (5).

The present invention is also a spectropolarimeter comprising:
a) a provision for capturing a beam of electromagnetic radiation;
b) a polarization state analyzer (4)
c) a wavelength separating element (7); and
c) a multi-element detector (8) of electromagnetic radiation.

In use, said captured beam of electromagnetic radiation enters said spectropolarimeter and is caused to interact with said polarization state analyzer (6), wavelength separating element, and said multi-element detector (8).

Said polarization state analyzer (6) is characterized in that it contains at least one of the following spatially varying compensators (10):

a combination of two or more birefringent optics with crystal axes oblique to each other and spatial thickness variation; and an array of retarding elements not structured on the order of the measured wavelength(s);

that function to impart a plurality of polarization states that result in a spatial distribution of intensities over a cross-section of said beam by interaction with the polarization state analyzer (6).

In use intensities are detected at multiple positions in said distribution thereof by a corresponding plurality of elements of said detector (8) and analyzed to determine the polarization state of the beam for a range of wavelengths.

A method of characterizing the polarization state of a beam of electromagnetic radiation then involves:
a) providing a system as just described;
b) accessing a beam of electromagnetic radiation therewith so that date is produced by said detector (8);
c) accessing data provided by said detector (8) in response to the accessed beam of electromagnetic radiation input thereto, and
d) analyzing said data to characterize said sample (5).

The present invention will be better understood by reference to the Detailed Description Section of this Specification, in conjunction with the Drawings.

SUMMARY

It is an object of the present invention to provide a snapshot ellipsometer capable of characterizing a sample in a single frame capture with full sensitivity of sample parameters psi and delta in any range of values. To achieve this object, novel arrangements of spatially varying polarizing elements were developed. Prior art ellipsometers have made use of wedged birefringent crystals and Babinet compensators to spatially modulate the polarization state of a measurement beam. This method allows snapshot measurements, but is incapable of fully characterizing a sample. A novel feature of the present invention is the use of two such wedges with obliquely oriented crystal axes to spatially modulate the polarization state of a measurement beam.

It is another novel feature of the present invention to use an array of liquid-crystal retarding elements with multiple crystal orientations present to provide the required spatial modulation.

It is another novel feature of the present invention for the measurement beam to interact with a spatially varying polarization element both before and after interacting with a sample to provide additional information about the sample. Some combinations of spatially varying polarization elements, such as a variable-azimuth retarder array on each side of the sample, are even capable of measuring the complete Mueller Matrix characterizing a sample.

BRIEF DESCRIPTION OF THE DRAWINGS

FIG. 1A and FIG. 1B show front and top views of an embodiment of the present invention, respectively.

FIG. 2 demonstrates a retarder array which is designed to have linearly varying compensator azimuthal position across the array. The fast axis direction at each location is shown with a line across the face of the sub-element.

FIGS. 4A and 4B show front and side views, respectively, of an ellipsometer system that implements spatially varying compensators (10) on the source (2) and detector (8) side, as well as additional imaging optics (12) used to reduce the size of the beam on the sample (5) and image the spatially varying compensators (10) onto the detector (8).

FIG. 7A and FIG. 7B are front and alternative (unfolded top) views of a present invention polarimeter.

DETAILED DESCRIPTION

Figure 3A:
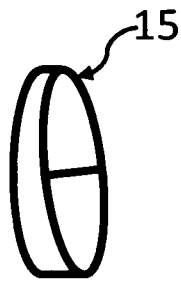
FIG. 3A shows a single birefringent wedge. The fast axis is shown with a line across the face of the wedge.

Turning now to the Drawings, a preferred embodiment of a present invention ellipsometer (1) is shown in FIG. 1. The preferred embodiment includes a source (2) that generates a beam of electromagnetic radiation (3). Said beam of electromagnetic radiation (3) is caused to interact with a polarization state generator (4) which is comprised of at least a single polarizer (9), to create a known polarization state before interacting with a sample (5). The beam then interacts with a polarization state analyzer (6), comprised of a spatially varying compensator (10) and an analyzer (9) causing the beam to have a spatial distribution of intensity along one dimension. (Note, Analyzers and Polarizers are the same the type of elements, with the distinction being that they are deployed on source and detector sides of a sample, respectively, in an ellipsometer). A wavelength separating element (7) such as a dispersion prism or diffraction grating serves to separate the individual wavelengths along the orthogonal dimension. A multi-element detector (8) captures a portion of said wavelength dependent intensity profile in a single frame. Knowledge of the polarization effects of the polarization state generator (4) and polarization state analyzer (6) allows calculation of wavelength dependent sample parameters based on the intensity profile of the beam of electromagnetic radiation. Additional imaging optics (12) are present that manipulate the beam and provide resolution of required dimensions. Linear variation of the spatially varying compensator (10) is imaged onto one dimension of the detector (8) while spectral separation caused by the wavelength separating element (7) is imaged onto the orthogonal dimension. The spectral resolution is governed by the divergence of the beam and doesn't require an additional slit on the detector side.

The present patent discloses the application of two types of spatially varying compensators (10) for use in snapshot ellipsometers. Both provide adequate modulation of the polarization state of a beam to completely characterize an isotropic sample. Said spatially varying compensators (10) are as follows:
a) a combination of two or more wedged birefringent optics (16) with crystal axes oblique to each other, and;

b) an array of retarding elements (13)(14) not structured on the order of the wavelength(s) present in the measurement beam.

With reference to FIG. 2, a diagram of a microretarder array (13) is shown with a magnified view of the individual compensator elements (14). The fast axis azimuth of each retarder element is shown to be varying linearly along the horizontal dimension θ=Caz[x]., while there is no variation vertically. This pattern allows for simplified data extraction along the horizontal dimension and for wavelength separation in the vertical dimension.

The Mueller-Stokes formalism can be used to mathematically describe the disclosed retarder array (13):

$$\text{Compensator}(C[x]) = \begin{pmatrix} 1 & 0 & 0 & 0 \\ 0 & 1 & 0 & 0 \\ 0 & 0 & \cos(d) & -\sin(d) \\ 0 & 0 & \sin(d) & \cos(d) \end{pmatrix}$$

$$\text{Rotation}(C[x]) = \begin{pmatrix} 1 & 0 & 0 & 0 \\ 0 & \cos(2C_{az}[x]) & \sin(2C_{az}[x]) & 0 \\ 0 & -\sin(2C_{az}[x]) & \sin(2C_{az}[x]) & 0 \\ 0 & 0 & 0 & 1 \end{pmatrix}$$

Using the Mueller-Stokes formalism, the theoretical signal intensity at the detector (8) of ellipsometer (1) can be expressed as a function of spatial position, x.

$$\text{Intensity}(x) = D \cdot R(-A) \cdot A \cdot R(A) \cdot R(-C[x]) \cdot C[x] \cdot R(C[x]) \cdot S \cdot R(-P) \cdot P \cdot R(P) \cdot L$$

The following intensity formula is given for an isotropic sample, assuming a quarter wave retarder array with variable azimuth, polarizer azimuth set to 45°, and analyzer azimuth set to 0°:

$$\text{Intensity}(x) = 1 - N \cdot \cos[2x]^2 + S \cdot \sin[2x] + \frac{1}{2} \cdot C \cdot \sin[4x]$$

It is evident the spatially varying intensity for the described retarder array is analogous to the temporal variation of a rotating compensator system. Fourier transformation of the signal decomposes the expression into components occurring at different spatial frequencies.

$$\alpha_k = \text{Re}\left\{\frac{1}{P}\int_{-\frac{P}{2}}^{\frac{P}{2}} (1 - N \cdot \cos[2x]^2 + S \cdot \sin[2x]) + \frac{1}{2} \cdot C \cdot \sin[4x]\right) \cdot e^{-2\pi i \left(\frac{k}{P}\right)x} \, dx \right\}$$

$$\beta_k = \text{Im}\left\{\frac{1}{P}\int_{-\frac{P}{2}}^{\frac{P}{2}} (1 - N \cdot \cos[2x]^2 + S \cdot \sin[2x]) + \frac{1}{2} \cdot C \cdot \sin[4x]\right) \cdot e^{-2\pi i \left(\frac{k}{P}\right)x} \, dx \right\}$$

The Fourier coefficients ($\alpha_k, \beta_k$) are non-zero at certain frequencies, k, related to the geometry of the optic. Fourier transformation of the theoretical intensity expression identifies harmonic frequencies at two and four times the spatial frequency of the compensator variation.

The 2ω and 4ω harmonics provide information about three sample parameters (N, C, & S) in a single measurement. The variable w now has units of rad/mm rather than rad/s. The theoretical Fourier coefficients are related to sample parameters as follows:

$$\alpha_0 = 1 - \frac{N}{2}$$

$$\alpha_2 = 0$$

$$\beta_2 = \frac{S}{2}$$

$$\alpha_4 = -\frac{N}{4}$$

$$\beta_4 = \frac{C}{4}$$

Thus, the theoretical relationship between Fourier coefficients and sample parameters is the same as the rotating compensator instrument. This holds true for the general case, where any polarizer or analyzer position is used. The main requirement for this to hold true is that the retardance of the retarder array be constant across all pixels.

Figure 3B:
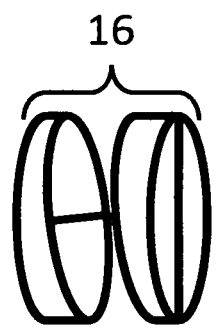
FIG. 3B shows a Babinet Compensator is mathematically equivalent to a single wedge but provides a lower order retardance.
Figure 3C:
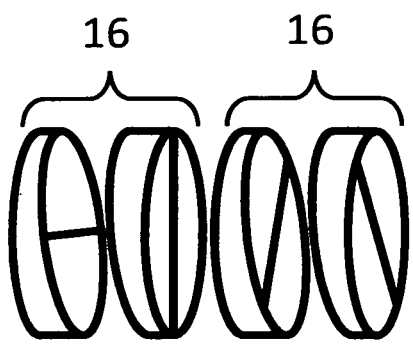
FIG. 3C shows a double Babinet compensator.
Figure 3D:
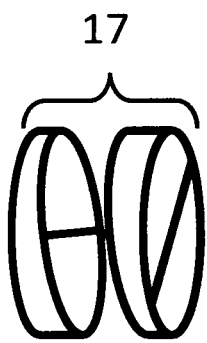
FIG. 3D shows a wedge pair with crystal axes oriented obliquely to each other.
Figure 3E:
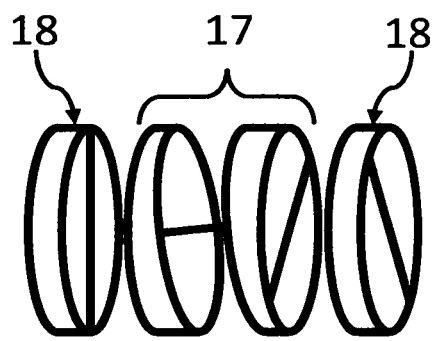
FIG. 3E shows a novel compound prism which provides full sample sensitivity and is also a low-order retarder. The fast axis direction of each birefringent element is shown by a line across the face of the optic.

With reference to FIGS. 3A-3F, several birefringent wedges and compound prisms are shown which can be used as spatially varying compensators. The elements are shown separated in an exploded view, but can be attached together for ideal performance. FIG. 3A shows a single birefringent wedge (15), which provides spatial variation of retardance. The fast axis of the element is shown as a line on the face of the optic. FIG. 3B shows a Babinet compensator (16), which consists of two birefringent wedges attached as shown with orthogonal fast axes. This combination provides a low-order retardance and reduced beam deviation. FIG. 3C shows a combination of two Babinet compensators (16) with different crystal orientations. Because the wedge directions are aligned, the retardance is only varied along the vertical direction. The combination of multiple fast axes provides additional information about the sample, but aligning four separate wedges is difficult in practice. The wedge slopes for the two Babinet compensators can either be identical, allowing data extraction at a single spatial frequency, or different, allowing the modulation of each wedge to be extracted at a separate spatial frequency. FIG. 3D shows birefringent wedge pair (17) with oblique (neither orthogonal nor parallel) crystal axes. This optic provides the required beam modulation for full isotropic sample characterization. This combination of optics is novel for use in ellipsometry, however it exhibits multi-order retardance. FIG. 3E shows a novel advancement to the previously described optics, where additional parallel retarding plates (18) are attached to each side of a wedge pair (17). Because each of the plate retarders has an optical axis orthogonal to one of the wedges and a similar retardance, the effective retardance for each wedge-plate pair is low-order. Additionally, the use of only one wedge pair results in decreased beam deviation and simplified alignment. Many compound wedges can be conceptualized that generate the required modulation and serve the same purpose in practice as those described. The use of at least two birefringent crystals with oblique fast axes and thickness variation along one dimension is the novel aspect that makes full sample characterization possible.

For the optics described in FIGS. 3C, 3D, and 3E with crystal axis orientations of each wedge ($W_1$, $W_2$) the theoretical signal intensity for ellipsometer (1) can be expressed by the following matrix multiplication:

$$\text{Intensity}(x) = D \cdot R(-A) \cdot A \cdot R(A) \cdot R(-W_2) \cdot W_2[x] \cdot R(W_2) \cdot R(-W_1) \cdot W_1[x] \cdot R(W_1) \cdot S \cdot R(-P) \cdot P \cdot R(P) \cdot L$$

The polarizer and analyzer are not oriented at eigenpolarization states of the wedges for each measurement. Assuming an isotropic sample, polarizer azimuth of 45°, fast axis of 0° for the first wedge and 90° for the second, analyzer azimuth of 0°, and an equal but inverse rate of retardance variation for both wedges, the theoretical signal intensity takes the following form:

$$\text{Intensity}(x) = \frac{1}{2}(2 + C - 2 \cdot N \cdot \text{Cos}[Dx] - C \cdot \text{Cos}[2Dx] + S \cdot \text{Sin}[2Dx])$$

A Fourier transformation of the signal decomposes the expression into components occurring at different spatial frequencies.

$$\alpha_k = \text{Re}\left\{ \frac{1}{P}\int_{-\frac{P}{2}}^{\frac{P}{2}} \frac{1}{2}(2 + C - 2 \cdot N \cdot \text{Cos}[Dx] - C \cdot \text{Cos}[2Dx] + S \cdot \text{Sin}[2Dx]) \cdot e^{-2\pi i\left(\frac{k}{P}\right)x} dx \right\}$$

$$\beta_k = \text{Im}\left\{ \frac{1}{P}\int_{-\frac{P}{2}}^{\frac{P}{2}} + \frac{1}{2}(2 + C - 2 \cdot N \cdot \text{Cos}[Dx] - C \cdot \text{Cos}[2Dx] + S \cdot \text{Sin}[2Dx]) \cdot e^{-2\pi i\left(\frac{k}{P}\right)x} dx \right\}$$

The Fourier coefficients ($\alpha_k, \beta_k$) are non-zero at certain spatial frequencies, k, related to the orientation and spatial variation of the compensators. Fourier transformation of the theoretical intensity expression identifies harmonic frequencies related to the rate of retardance variation of the wedges and a DC term. Each frequency component consists of a real and imaginary component. The theoretical Fourier coefficients are related to sample parameters as follows:

$$\alpha_0 = 2 + C$$
$$\alpha_D = -N$$
$$\beta_D = 0$$
$$\alpha_{2D} = -\frac{C}{2}$$
$$\beta_{2D} = \frac{S}{2}$$

Using the theoretical expressions for Fourier coefficients to solve for sample parameters, it's evident that a snapshot ellipsometer comprised of two spatially varying elements can measure three sample parameters in any single measurement as shown in the following Mueller Matrix description of the sample. An X indicates insensitivity to that parameter.

$$\text{Sample} = \begin{pmatrix} 1 & \alpha_D & 0 & X \\ \alpha_D & 1 & 0 & X \\ 0 & 0 & 2\alpha_{2D} & X \\ 0 & 0 & -\beta_{2D} & X \end{pmatrix}$$

Thus, a snapshot ellipsometer comprised of the described spatially varying retarder array or double wedge compensator is sensitive to at least three sample parameters and can measure Psi and Delta in any range of values.

In addition to the general layout described above, several preferred embodiment modifications are possible to improve the functionality of the system. Many of these are illustrated in FIGS. 4A and 4B.

The beam of electromagnetic radiation that is incident on the sample can be focused with additional imaging optics such that the beam has a smaller cross-sectional area at the sample. This modification reduces the effects that sample misalignment and non-uniformity have on data quality.

By using spatially varying compensators (10) in both the polarization state generator (4) and polarization state analyzer (6), the full Mueller Matrix describing a sample can be measured. If each spatially varying compensator (10) effects a different spatial frequency on the detector (8), parameters can be extracted at each of the component frequencies as well as at summations and differences of these frequencies. This can be achieved by using two SVCs with different spatial frequencies or by magnifying each differently onto the detector.

Because the intensity profile that results on the detector (8) is effected by spatial variation of the spatially varying compensators (10), it is important to achieve adequate resolution between the two components. With reference to FIGS. 4A and 4B, additional imaging optics (12) are shown and used to ensure that the image planes of the spatially varying compensators (10) overlap onto each other and enter the detector (8). In FIGS. 4A and 4B, additional imaging optics (12) near the sample (5) are used both to focus the beam onto the sample (5) and to image the spatially varying compensators (10) after it interacts with the sample (5). If a spatially varying compensator (10) only has variation in one dimension, it is only necessary to image the axis of variation onto the detector (8), which can be achieved by using cylindrical optics. While a slit could be utilized, this is done in lieu of using a slit at the entrance of the detector. The cylindrical optic after the polarization state analyzer (6) and the spherical optic after the wavelength separation element (7) serve to image the spatially varying compensators (10) variation onto one dimension of the detector (8) and the wavelength separation onto the orthogonal dimension.

Figure 5:
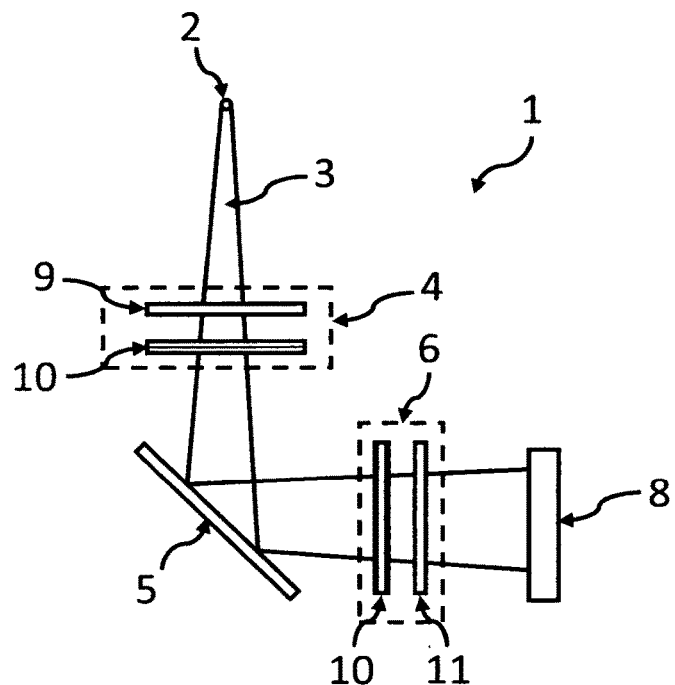
FIG. 5 is a simple ellipsometer that has spatially varying compensators (10) in both the polarization state generator (4) and polarization state analyzer (6), and which does not require imaging optics to achieve spatially varying compensators (10) magnification and resolution.

The simplest method of ensuring adequate resolution and proper magnification in a system comprising two spatially varying compensators (10) is shown in FIG. 5. The beam used in this example acts as a point-like source such as the output of an optical fiber or pinhole. A fiber can serve to homogenize the beam and provide layout flexibility. The point-like source of a beam of electromagnetic radiation (2) ensures that both spatially varying compensator elements (10) are adequately resolved onto the detector (8) without any additional optics, similarly to the function of a pinhole camera. The expanding nature of the beam serves to magnify the spatially varying compensators (10) with respect to each other, resulting in the modulation of each spatially varying compensator (10) having a different spatial frequency on the detector (8) and allowing the signals to be separated.

Figure 6:
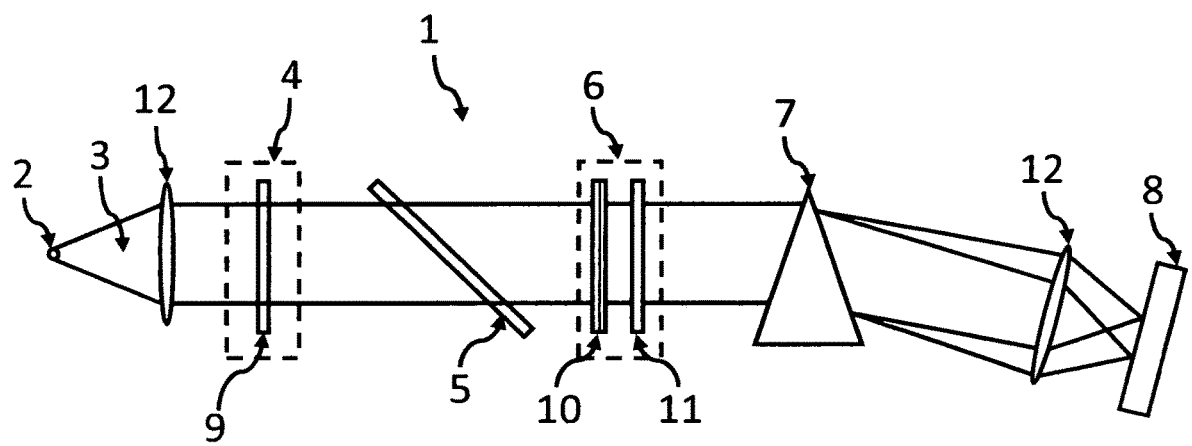
FIG. 6 is another embodiment arranged to measure a sample (5) in transmission instead of reflection mode.

The system layout of FIG. 6 is identical to that of FIG. 1, however the sample is now measured in transmission instead of reflection. This may be advantageous for certain samples.

The layout shown in FIGS. 7A and 7B illustrates a spectropolarimeter that can be used to measure a beam of electromagnetic radiation, consisting of the polarization state analyzer (6), wavelength separation element (7), and detector (8) as described previously. The polarization state analyzer (6) comprises a spatially varying compensator (10) and an analyzer (9) to fully characterize the polarization information of the beam. The wavelength separation element (7) allows the complete polarization state to be characterized for multiple optical wavelengths. An additional imaging optic ensures resolution between the variation axis of the spatially varying compensator (10) and the detector (8). A wavelength separating element (7) is shown as a curved diffraction grating, which requires no further optics to resolve the spectral information of the beam. Said beam can be filtered or homogenized through use of pinholes, slits, and optical fibers to ensure data accuracy, as is the norm for polarimeters.

Said source of a beam of electromagnetic radiation (2) can be, where not excluded by Claim language, a selection from the group consisting of:
  a laser;
  an LED;
  a broadband source;
  a FTIR source;
  a globar source;
  an incandescent source; and
  an arc lamp.

In addition, multiple electromagnetic radiation sources can be used and their optical signals combined in order to function as a single source of a beam of electromagnetic radiation (2) with more favorable spectral characteristics. For instance, electromagnetic radiation from several LEDs and lasers can be co-collimated using hot/cold mirrors, beam-splitters, bifurcated fiber optics, or other methods in order to produce a broadband beam.

Said source of a beam of electromagnetic radiation (2) can also be the output of a monochromator that provides only one optical wavelength. The source of a beam of electromagnetic radiation (2) and can also be provided as the output of a fiber optic or pinhole through which electromagnetic radiation is transmitted in order to act as a point-like source and homogenize the beam.

Said spatially varying compensator(s) (10) can be, where not excluded by Claim language, a selection from the group consisting of:
  an array (13) of retarder elements (14) not structured at the scale of the optical wavelengths present; and
  a combination of at least two birefringent wedges (16) with crystal axes oriented oblique to each other.

In the preferred embodiments, modulation created by the spatially varying compensator(s) (10) is only in one dimension and the LS used further creates a beam with multiple optical wavelengths present. A wavelength separating element such as a dispersion prism or diffraction grating (eg. (7)), is used to separate the individual wavelengths along the other dimension of the two-dimensional detector (8). This allows sample parameters to be determined independently for each wavelength.

Said wavelength separating element (7) can be, where not excluded by Claim language, any element or any combination of elements that allows separation or selection of different wavelengths present within the beam, including:
  a flat or curved diffraction grating;
  a dispersion prism; and
  a filter element that transmits, attenuates, or reflects different wavelengths at different positions thereof.

A retarder array can be designed to spatially vary retardance and/or fast axis orientation in a sequential or non-sequential manner. This preferred embodiment describes a retarder array in which the azimuthal orientation of each compensator element is varied in a sequential manner, either through optical design or data manipulation. This approach is mathematically analogous to a rotating compensator ellipsometer, but the azimuthal rotation matrix has a spatial rather than time dependency. For an array of retarding elements, the individual elements or zones can be in any pattern, so long as there are adequate azimuths or retardances present to characterize the sample. If the elements are linearly varying in azimuth and constant in retardance, the Fourier analysis above can be used for data extraction. For other patterns or values of elements, alternative analysis methods can be used.

While prior art discloses the use of single-wedge systems and patterned dielectric grid retarders to analyze a beam of electromagnetic radiation after interaction with a sample, it is a novel approach in ellipsometry to probe a sample with a beam of electromagnetic radiation that has multiple polarization states present at several spatial positions therein due to any type of spatially varying polarization element in the polarization state generator (4).

It is also novel to use a spatially varying polarization element in both the polarization state generator (4) and the polarization state analyzer (6) in order to probe a sample with a beam of electromagnetic radiation that has multiple polarization states present at several spatial positions therein due to any type of spatially varying polarization element in the polarization state generator (4), while simultaneously analyzing the polarization states present with a spatially varying polarization element in the polarization state analyzer (6) such that anisotropic samples can be fully characterized.

For clarity and simplicity, example systems have generally been shown and described as using refractive optics, but one skilled in the art should recognize that refractive, reflective, and diffractive optics can all be used to accomplish the same functions as the elements described. In addition, the measurement beam is shown interacting with the sample in reflection, however electromagnetic radiation transmitted through a sample can also allow sample characterization.

It is also noted that a Fourier transformation has been described as one signal processing technique to extract sample parameters. One skilled in the art would recognize other signal processing techniques which enable extraction of sample parameters from measured intensity profiles.

It is noted that a beam propagation direction can be defined for any beam, be it collimated or focused etc., or not. While it is not critical to the present invention as to how this is done in practice in any specific case, it should be appreciated that the terminology "beam" is to be understood for the purposes of this disclosure to be characterized by a direction of propagation of electromagnetic radiation with a finite cross-sectional area. The cross-sectional area of a beam refers to any convenient two dimensional measure of a beam that allows different positions therein to be identified, each much as a separate beam. That is, the present invention considers a beam of electromagnetic radiation to be an effective combination of many individual "separate" beams that can be affected differently, substantially independent of how other similar effectively "independent" beams are affected.

It is noted that the terms "cylindrical" and "spherical" are occasionally used to refer to imaging elements such as curved mirrors and lenses. These terms are not used to describe the exact shape of the optic surfaces, only to identify whether an optic has curvature in only one dimension, as a section of a cylinder; or both dimensions, as a section of a sphere. Other sections of parabolic, elliptical, and aspheric geometries are understood to be included.

It is to be appreciated that the recited negative limitations can be incorporated into Claims to avoid prior art references, but if a negative limitation is not included in a Claim, absence of said element is not an indication that the element is not present in a present invention system at least at one location therein, wherein the Claim is premised by "comprising".

It is also noted that various elements not relied upon to provide novelty, but mentioned in this Application are not specifically presented in the Drawings. Examples are wavelength filters, beam splitters, slits and fiber optics as part of a source of a beam of electromagnetic radiation, cylindrical optics, spherical optics applied in beam resolution at a detector, planar gratings, and various source types a laser, LED, broadband, FTIR, globar, incandescent arc lamp, etc. Such elements are well known in the art, and can be found presented and described in, for instance, Patents Assigned to the J. A. Woollam Co., Inc., as identified and available on the PTO Website. There are presently about 195 such Patents, and they are all incorporated hereinto by reference. Applicant reserves the right to import content from the identified Patents.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in breadth and scope only by the Claims.

We claim:

1. An ellipsometer comprising:
   a) a source of a beam of electromagnetic radiation (2);
   b) a polarization state generator (4);
   c) a sample (5) positioned to interact with a beam of electromagnetic radiation at a known angle of incidence;
   d) a polarization state analyzer (6), and
   e) a multi-element detector (8) of electromagnetic radiation;
   such that in use, a beam of electromagnetic radiation (3) is generated by said source of a beam of electromagnetic radiation (2), and is caused to interact with said polarization state generator (4), said sample (5), said polarization state analyzer (6), and said multi-element detector (8), said polarization state generator (4) and/or said polarization state analyzer (6) further contain at least one of the following spatially varying compensators (10):
   a combination of two or more birefringent optics (16) with crystal axes oblique to each other and spatial thickness variation; and
   an array of retarding elements (13)(14) not structured on the order of the measured wavelength(s);
   said spatially varying compensators (10) functioning to impart a plurality of spatially separated polarization states such that a spatial distribution of intensities over a cross-sectional area of said beam results, which, after interacting with the polarization state analyzer (6) are detected at a corresponding multiplicity of positions by a corresponding plurality of spatially distributed elements in said detector (8),
   which can be analyzed to determine sample properties.

2. An ellipsometer as in claim 1, which further comprises at least one imaging element present between the spatially varying compensators (10) and said multi-element detector (8) to improve resolution regarding correspondence between specific points on said spatially varying compensators (10) and said detector (8).

3. An ellipsometer as in claim 1, in which the beam provided by said source of a beam of electromagnetic radiation (2) comprises multiple wavelengths, and in which said detector (8) is two-dimensional, and wherein said ellipsometer further comprises at least one wavelength separating element (7) prior to said detector (8), such that in use the polarization effects of the sample can be determined for multiple wavelengths at each location of a sample investigated.

4. An ellipsometer as in claim 3 in which the at least one wavelength separating element (7) is selected from the group consisting of:
   a planar or curved diffraction grating;
   a dispersing prism; and
   an attenuating or reflecting filter element that transmits, blocks, or reflects different wavelengths at different positions thereof.

5. An ellipsometer as in claim 3 in which at least one additional focusing optic resolves the spectral variation caused by said wavelength separating element (7) onto one dimension of the detector (8).

6. An ellipsometer as in claim 1 in which said source of a beam of electromagnetic radiation (2) is selected from the group consisting of:
   a broadband or monochromatic laser;
   a broadband or narrowband LED;
   a monochromator;
   a broadband source;
   a FTIR source;
   a globar source;
   an incandescent source; and
   an arc lamp.

7. An ellipsometer as in claim 1 in which multiple sources of a beam of electromagnetic radiation (2) are used in combination to extend the wavelength range or to provide a more uniform intensity profile across the measured electromagnetic spectrum.

8. An ellipsometer as in claim 1 which further contains a beam splitting element and the intensity profiles of both resulting beams are detected in order to improve data quality or provide an image of the beam profile or sample surface.

9. An ellipsometer as in claim 1 in which a spatially varying compensator (10) is present in both the polarization state generator (4) and polarization state analyzer (6), and where the spatial modulation of the two elements are optically overlaid with a known relationship using imaging optics and/or low divergence illumination.

10. An ellipsometer as in claim 9 in which the spatially varying compensators impart different effective modulation frequencies onto the detector through magnifying optics, variations in spatially varying compensator characteristics, and/or converging or expanding illumination.

11. An ellipsometer as in claim 10 in which the effective spatial modulation frequencies of the polarization state analyzer and polarization state generator are imaged at a ratio of 1:3, 3:1, 1:5, 5:1, 3:5, or 5:3 onto the detector (8).

12. An ellipsometer as in claim 1 in which an angle of incidence of the electromagnetic beam to a surface of said sample is adjustable.

13. An ellipsometer as in claim 1 in which the source of a beam of electromagnetic radiation (2) is the output from a monochromator, an optical fiber, or a pinhole so that the beam has spectral or spatial characteristics provided thereby.

14. An ellipsometer as in claim 1 in which the beam of electromagnetic radiation provided by said source of a beam of electromagnetic radiation (2) does not approach the sample surface along a locus normal to, or substantially normal thereto.

15. An ellipsometer as in claim 1 which is characterized by at least one selection from the group consisting of:
the source does not comprise one or more lasers, and
there is no series combination of a slit and wedge shaped compensator element between the source and the sample.

16. An ellipsometer comprising:
a) a source of a beam of electromagnetic radiation (2);
b) a polarization state generator (4);
c) a sample positioned to interact with a beam of electromagnetic radiation at a known angle of incidence;
d) a polarization state analyzer (6); and
e) a multi-element detector (8) of electromagnetic radiation;
said ellipsometer being characterized in that both said polarization state generator (4) and said polarization state analyzer (6) comprise at least one element having a plurality of locations (13) (14), or a plurality of elements each having at least one location (16), or a combination thereof, each of said element locations serving to effect beam polarization characteristics that depend on how a portion of said beam cross-sectional area interacts with at least one of said locations therein;
such that in use the beam of electromagnetic radiation generated by said source of a beam of electromagnetic radiation (2) is caused to interact with said polarization state generator (4), said sample (5), and said polarization state analyzer (6), such that a spatial intensity distribution results over the cross-section of said beam and a corresponding plurality of locations in said beam cross-section are substantially simultaneously detected by said multi-element detector (8);
such that in use, said intensity profile is analyzed using knowledge of the properties of the polarization state generator (4) and polarization state analyzer (6) to characterize properties of said sample (5).

17. A spectropolarimeter comprising:
a) a beam access;
b) a polarization state analyzer (4);
c) a wavelength separating element (7); and
d) a multi-element detector (8) of electromagnetic radiation;
such that in use, said beam of electromagnetic radiation enters said spectropolarimeter and is caused to interact with said polarization state analyzer (6), wavelength separating element, and said multi-element detector (8);
said polarization state analyzer (6) comprising at least one of the following spatially varying compensators (10):
a combination of two or more birefringent optics with crystal axes oblique to each other and spatial thickness variation; and
an array of retarding elements not structured on the order of the measured wavelength(s);
that function to impart a plurality of polarization states that result in a spatial distribution of intensities over a cross-section of said beam by interaction with the polarization state analyzer (6);
such spectropolarimeter being characterized in that, in use, intensities are detected at multiple positions in said distribution thereof by a corresponding plurality of elements of said detector (8) and are analyzed to determine the polarization state of the beam for a range of wavelengths.

18. A method of characterizing a sample (5), comprising the steps of:
a) providing an ellipsometer comprising:
a') a source of a beam of electromagnetic radiation (2);
b') a polarization state generator (4);
c') a sample (5) positioned to interact with a beam of electromagnetic radiation at a known angle of incidence;
d') a polarization state analyzer (6), and
e') a multi-element detector (8) of electromagnetic radiation;
such that in use, a beam of electromagnetic radiation (3) is generated by said source of a beam of electromagnetic radiation (2), and is caused to interact with said polarization state generator (4), a sample (5), said polarization state analyzer (6), and said multi-element detector (8), said polarization state generator (4) and/or said polarization state analyzer (6) further contain at least one of the following spatially varying compensators (10):
a combination of two or more birefringent optics (16) with crystal axes oblique to each other and spatial thickness variation; and
an array of retarding elements (13)(14) not structured on the order of the measured wavelength(s);
said spatially varying compensators (10) functioning to impart a plurality of spatially separated polarization states such that a spatial distribution of intensities over a cross-sectional area of said beam results, which, after interacting with the polarization state analyzer (6) are detected at a corresponding multiplicity of positions by a corresponding plurality of spatially distributed elements in said detector (8);
b) causing said source of a beam of electromagnetic radiation (2) to provide a beam of electromagnetic radiation (3) which is directed to interact with said a polarization state generator (4), interact with a sample (5) accessed via said provision for causing a collimated or non-collimated beam of electromagnetic radiation (3) to interact with a sample at a known angle of incidence, interact with said a polarization state analyzer (6), and enter said multi-element detector (8) of electromagnetic radiation;
b) accessing data provided by said detector (8) in response to the electromagnetic radiation input thereto, and
c) analyzing said data to characterize said sample (5).

19. A method as in claim 18, which is further characterized by at least one selection from the group consisting of:
1) said ellipsometer further comprises at least one imaging element present between the spatially varying compensators (10) and said multi-element detector (8) to improve resolution regarding correspondence between specific points on said spatially varying compensators (10) and said detector (8);
2) said beam provided by said source of a beam of electromagnetic radiation (2) comprises multiple wavelengths, and in which said detector (8) is two-dimensional, and wherein said ellipsometer further comprises at least one wavelength separating element (7) prior to said detector (8), such that in use the polarization effects of the sample can be determined for multiple wavelengths at each location of a sample investigated;
3. said beam provided by said source of a beam of electromagnetic radiation (2) comprises multiple wavelengths, and in which said detector (8) is two-dimensional, and wherein said ellipsometer further comprises at least one wavelength separating element (7) prior to said detector (8), such that in use the polarization effects of the sample can be determined for multiple wavelengths at each location of a sample investigated, and in which the at least one wavelength separating element (7) is selected from the group consisting of:
  a planar or curved diffraction grating;
  a dispersing prism; and
  an attenuating or reflecting filter element that transmits, blocks, or reflects different wavelengths at different positions thereof;
4) said beam provided by said source of a beam of electromagnetic radiation (2) comprises multiple wavelengths, and in which said detector (8) is two-dimensional, and wherein said ellipsometer further comprises at least one wavelength separating element (7) prior to said detector (8), such that in use the polarization effects of the sample can be determined for multiple wavelengths at each location of a sample investigated; and there is at least one additional focusing optic resolves the spectral variation caused by said wavelength separating element (7) onto one dimension of the detector (8);
5) said source of a beam of electromagnetic radiation (2) is selected from the group consisting of:
  a broadband or monochromatic laser;
  a broadband or narrowband LED;
  a monochromator;
  a broadband source;
  a FTIR source;
  a globar source;
  an incandescent source; and
  an arc lamp;
6) multiple sources of a beam of electromagnetic radiation (2) are used in combination to provide a wider spectrum;
7) said ellipsometer further contains a beam splitting element and the intensity profiles of both resulting beams are detected in order to improve data quality or provide an image of the beam profile or sample surface;
8) said ellipsometer comprises a spatially varying compensator (10) is present in both the polarization state generator (4) and polarization state analyzer (6), and where the spatial modulation of the two elements are optically overlaid with a known relationship using imaging optics and/or low divergence illumination;
9) said ellipsometer comprises a spatially varying compensator (10) present in both the polarization state generator (4) and polarization state analyzer (6), and where the spatial modulation of the two elements are optically overlaid with a known relationship using imaging optics and/or low divergence illumination, and the spatially varying compensators impart different effective modulation frequencies onto the detector through magnifying optics, variations in spatially varying compensator characteristics, and/or converging or expanding illumination;
10) said ellipsometer comprises a spatially varying compensator (10) is present in both the polarization state generator (4) and polarization state analyzer (6), and where the spatial modulation of the two elements are optically overlaid with a known relationship using imaging optics and/or low divergence illumination, in which the effective spatial modulation frequencies of the polarization state analyzer and polarization state generator are at a ratio of 1:3, 3:1, 1:5, 5:1, 3:5, or 5:3;
11) an angle of incidence of the electromagnetic beam to a surface of said sample is adjustable;
12) the source of a beam of electromagnetic radiation (2) is the output from a monochromator, an optical fiber, or a pinhole so that the beam has spectral or spatial characteristics provided thereby;
13) the beam of electromagnetic radiation provided by said source of a beam of electromagnetic radiation (2) does not approach the sample surface along a locus normal to, or substantially normal thereto; and
14) the ellipsometer is characterized by at least one selection from the group consisting of:
  the source does not comprise one or more lasers, and
  there is no series combination of a slit and wedge shaped compensator element between the source and the sample.

20. A method of characterizing a sample (5), comprising the steps of:
  a) providing an ellipsometer comprising:
    a') a source of a beam of electromagnetic radiation (2);
    b') a polarization state generator (4);
    c') a sample (5) positioned to interact with a beam of electromagnetic radiation at a known angle of incidence to interact with said beam at a known angle of incidence;
    d') a polarization state analyzer (6); and
    e') a multi-element detector (8) of electromagnetic radiation;
  said ellipsometer being characterized in that both said polarization state generator (4) and said polarization state analyzer (6) comprise at least one element having a plurality of locations (13) (14), or a plurality of elements each having at least one location (16), or a combination thereof, each of said element locations serving to effect beam polarization characteristics that depend on how a portion of said beam cross-sectional area interacts with at least one of said locations therein;
  such that in use the beam of electromagnetic radiation generated by said source of a beam of electromagnetic radiation (2) is caused to interact with said polarization state generator (4), said sample (5), and said polarization state analyzer (6), such that a spatial intensity distribution results over the cross-section of said beam and a corresponding plurality of locations in said beam cross-section are substantially simultaneously detected by said multi-element detector (8);
  such that in use, said intensity profile is analyzed using knowledge of the properties of the polarization state generator (4) and polarization state analyzer (6) to characterize properties of said sample (5);
  b) causing said source of a beam of electromagnetic radiation (2) to provide a beam of electromagnetic radiation (3) which is directed to interact with said polarization state generator (4), interact with a sample (5) accessed via said provision for causing a collimated or non-collimated beam of electromagnetic radiation (3) to interact with a sample at a known angle of incidence, interact with said a polarization state and enter said detector (8);
  b) accessing data provided by said detector (8) in response to the electromagnetic radiation input thereto;
  c) analyzing said data to characterize said sample (5).

21. A method as in claim 20 which is further characterized by at least one selection from the group consisting of:

1) said ellipsometer further comprises at least one imaging element present between the spatially varying compensators (10) and said multi-element detector (8) to improve resolution regarding correspondence between specific points on said spatially varying compensators (10) and said detector (8);
2) said beam provided by said source of a beam of electromagnetic radiation (2) comprises multiple wavelengths, and in which said detector (8) is two-dimensional, and wherein said ellipsometer further comprises at least one wavelength separating element (7) prior to said detector (8), such that in use the polarization effects of the sample can be determined for multiple wavelengths at each location of a sample investigated;
3) said beam provided by said source of a beam of electromagnetic radiation (2) comprises multiple wavelengths, and in which said detector (8) is two-dimensional, and wherein said ellipsometer further comprises at least one wavelength separating element (7) prior to said detector (8), such that in use the polarization effects of the sample can be determined for multiple wavelengths at each location of a sample investigated, and in which the at least one wavelength separating element (7) is selected from the group consisting of:
   a planar or curved diffraction grating;
   a dispersing prism; and
   an attenuating or reflecting filter element that transmits, blocks, or reflects different wavelengths at different positions thereof;
4) said beam provided by said source of a beam of electromagnetic radiation (2) comprises multiple wavelengths, and in which said detector (8) is two-dimensional, and wherein said ellipsometer further comprises at least one wavelength separating element (7) prior to said detector (8), such that in use the polarization effects of the sample can be determined for multiple wavelengths at each location of a sample investigated; and there is at least one additional focusing optic resolves the spectral variation caused by said wavelength separating element (7) onto one dimension of the detector (8);
5) said source of a beam of electromagnetic radiation (2) is selected from the group consisting of:
   a broadband or monochromatic laser;
   a broadband or narrowband LED;
   a monochromator;
   a broadband source;
   a FTIR source;
   a globar source;
   an incandescent source; and
   an arc lamp;
6) multiple sources of a beam of electromagnetic radiation (2) are used in combination to provide a wider spectrum;
7) said ellipsometer further contains a beam splitting element and the intensity profiles of both resulting beams are detected in order to improve data quality or provide an image of the beam profile or sample surface;
8) said ellipsometer comprises a spatially varying compensator (10) is present in both the polarization state generator (4) and polarization state analyzer (6), and where the spatial modulation of the two elements are optically overlaid with a known relationship using imaging optics and/or low divergence illumination;
9) said at least one element in each of said polarization state generator (4) and said polarization state analyzer (6) having a plurality of locations (22) (13), or a plurality of elements each having at least one location (16), or a combination thereof, provide that the spatial modulation of the two elements are optically overlaid with a known relationship using imaging optics and/or low divergence illumination;
10) said at least one element in each of said polarization state generator (4) and said polarization state analyzer (6) having a plurality of locations (22) (13), or a plurality of elements each having at least one location (16), or a combination thereof, provide that the spatial modulation of the two elements are optically overlaid with a known relationship using imaging optics and/or low divergence illumination, in which the effective spatial modulation frequencies of the polarization state analyzer and polarization state generator are at a ratio of 1:3, 3:1, 1:5, 5:1, 3:5, or 5:3;
11) an angle of incidence of the electromagnetic beam to a surface of said sample is adjustable;
12) the source of a beam of electromagnetic radiation (2) is the output from a monochromator, an optical fiber, or a pinhole so that the beam has spectral or spatial characteristics provided thereby;
13) the beam of electromagnetic radiation provided by said source of a beam of electromagnetic radiation (2) does not approach the sample surface along a locus normal to, or substantially normal thereto; and
14) the ellipsometer is characterized by at least one selection from the group consisting of:
the source does not comprise one or more lasers, and
there is no series combination of a slit and wedge shaped compensator element between the source and the sample.

22. A method of determining the polarization state of a beam of electromagnetic radiation for a range of wavelengths, comprising the steps of:
   a) providing a spectropolarimeter comprising:
      a') a beam access;
      b') a polarization state analyzer (4);
      c') a wavelength separating element (7); and
      d') a multi-element detector (8) of electromagnetic radiation;
   such that in use, said beam of electromagnetic radiation enters said spectropolarimeter and is caused to interact with said polarization state analyzer (6), wavelength separating element, and said multi-element detector (8);
   said polarization state analyzer (6) comprising at least one of the following spatially varying compensators (10):
      a combination of two or more birefringent optics with crystal axes oblique to each other and spatial thickness variation; and
      an array of retarding elements not structured on the order of the measured wavelength(s);
   that function to impart a plurality of polarization states that result in a spatial distribution of intensities over a cross-section of said beam by interaction with the polarization state analyzer (6);
   such spectropolarimeter being characterized in that, in use, intensities are detected at multiple positions in said distribution thereof by a corresponding plurality of elements of said detector (8) and are analyzed to determine the polarization state of the beam for a range of wavelengths;
   b) accessing a beam of electromagnetic radiation;
   c) accessing data provided by said detector (8) in response to the accessed beam of electromagnetic radiation input thereto, and d) analyzing said data to characterize said beam of electromagnetic radiation.

* * * * *